United States Patent [19]

Kime et al.

[11] Patent Number: 4,730,899

[45] Date of Patent: Mar. 15, 1988

[54] OPTICAL SIGNAL READING DEVICE

[75] Inventors: Kenjiro Kime; Kazuo Okada; Mitsushige Kondou, all of Nagaokakyo, Japan

[73] Assignee: Mitsubishi Denki Kabushiki Kaisha, Tokyo, Japan

[21] Appl. No.: 539,056

[22] Filed: Oct. 4, 1983

[30] Foreign Application Priority Data

Oct. 14, 1982 [JP] Japan ................... 57-181854

[51] Int. Cl.⁴ ............... G02B 27/14; G01J 1/20; G11B 7/00

[52] U.S. Cl. ................... 350/173; 250/201; 369/44

[58] Field of Search ........... 350/173, 162.17, 401; 250/201; 369/44, 45; 356/123

[56] References Cited

U.S. PATENT DOCUMENTS

| | | | |
|---|---|---|---|
| 2,815,695 | 12/1957 | Scharf et al. | 350/173 |
| 3,520,625 | 7/1970 | Gillieron et al. | 250/201 |
| 3,820,870 | 6/1974 | Smith | 350/173 |
| 4,032,776 | 6/1977 | Van Rosmalen | 250/201 |
| 4,063,287 | 12/1977 | Van Rosmalen | 369/44 |
| 4,261,646 | 4/1981 | Kotaka . | |
| 4,283,777 | 8/1981 | Curry et al. | 369/44 |
| 4,423,496 | 12/1983 | Opheij et al. | 369/44 |
| 4,505,584 | 3/1985 | Kato et al. | 356/123 |
| 4,507,766 | 3/1985 | Saimi et al. | 369/44 |
| 4,564,931 | 1/1986 | O'Hora et al. | 350/401 |

FOREIGN PATENT DOCUMENTS 164455 6/1982 Japan .
88532 6/1982 Japan .

*Primary Examiner*—John K. Corbin
*Assistant Examiner*—Loha Ben
*Attorney, Agent, or Firm*—Lowe, Price, LeBlanc, Becker & Shur

[57] ABSTRACT

An optical signal reading device comprising a laser light source (101), an objective (107) slidable in the direction of the optical axis which is at right angles to the disc surface of a disc-like record carrier, a light detector (110) for receiving the reflected light coming from the disc surface via the objective, and a beam splitter (104) comprised of a single optical part disposed between the light source (101), light detector (110), and objective (107). The splitter has a pair of reflecting surfaces disposed approximately parallel to each other to ensure that the incident light from the light source (101) and the reflected light guided to the light detector (110) are parallel and opposite to each other.

19 Claims, 14 Drawing Figures

OPTICAL SIGNAL READING DEVICE

BACKGROUND OF THE INVENTION

1. Field of the Invention

This invention relates to an optical signal reading device for an optical information recording and reproducing apparatus having at least either the function of reading information recorded on the track of a disc-like record carrier or the function of optically recording information on the recording medium, and more particularly it relates to an optical signal reading device having a beam splitter of improved construction.

2. Description of the Prior Art

Conventional devices of this type include a video disc device and a digital audio disc device. Conventional devices of this type generally comprise a light source, an objective for focusing the light emitted from the light source on the disc surface as a spot of light, and a light detector for detecting the reflected light from the disc surface led in through said objective. A beam splitter is disposed between the objective, light source, and light detector. Examples of such arrangements are disclosed in U.S. Pat. 4,261,646 and U.K. patent specification 1,532,345.

In these prior art devices, the light beam from the light source falling on the beam splitter is approximately at right angles to the reflected light from the disc surface guided to the light detector through the beam splitter. However, as fully described below, with such arrangement there are problems that installation of the light detector and beam splitter requires high precision and that complex adjustments of these optical parts are required.

Figure 1:
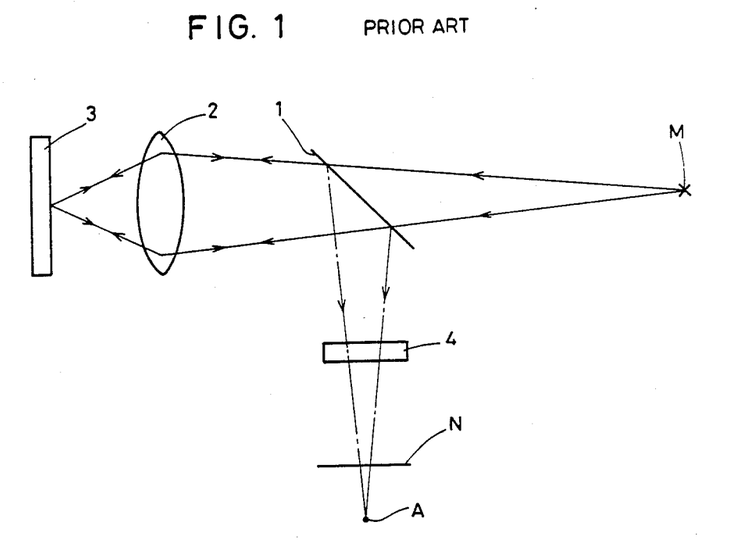
FIG. 1 is a view showing the arrangement of an optical system of prior art for explaining the problems with prior art.
Figure 2:
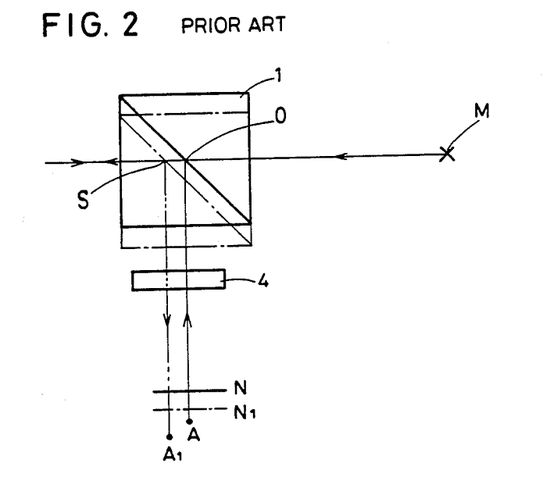
FIG. 2 is a fragmentary enlarged structural view of the principal portion of the arrangement shown in FIG. 1.

FIG. 1 is a schematic structural view of a conventional optical system for explaining the aforesaid problems. Referring to FIG. 1, the light emitted from a light source M is transmitted through the reflecting surface of a beam splitter 1 and then through an objective 2 and is focused on a disc surface 3. The reflected light from the disc surface 3 is guided by the objective 2 to the beam splitter 1. It is reflected by the reflecting surface of the beam splitter 1 and transmitted through a cylindrical lens 4 to a light detector N. In such arrangement, the distance between the beam splitter 1 and the light source M is equal to the distance between the beam splitter 1 and the convergence point A of light rays reflected by the beam splitter 1 to the light detector N. In other words, the point A and the light source M are in conjugate relation to each other with respect to the beam splitter 1. Where such astigmatic optical system is used, the light detector N must be located at a fixed distance from the convergence point A. In such arrangement, however, if the beam splitter is not correctly located, the position of the light detector N must be correctly readjusted. Such a problem may be more clearly understood by reference to FIG. 2 showing, on an enlarged scale, the relation between the beam splitter, light source, and light detector. The light emitted from the light source M is guided through the point O on the reflecting surface of the beam splitter 1 to the objective (not shown in FIG. 2). On the other hand, the light guided by the objective and reflected by the disc surface is reflected at point O on the reflecting surface of the beam splitter 1 and transmitted through the cylindrical lens 4 to the light detector N. In FIG. 2, as is clear from the above description, $\overline{OM} = \overline{OA}$ and it is necessary that the distance $\overline{NA} = l$ between the convergence point A and the light detector N be constant. If the beam splitter 1 is downwardly deviated as shown in phantom lines in FIG. 2, however, the reflected light from the objective is reflected at point S on the reflecting surface of the beam splitter 1. Therefore, the convergence point of the reflected light from point S moves to point A1 which satisfies the relation $\overline{SM} = \overline{SA1}$. The distance $\overline{SM}$ between the point S on the reflecting surface of the beam splitter 1 and the light detector N is longer by $\overline{SO}$ than before the beam splitter 1 is deviated. However, the distance $\overline{SN}$ between the point S on the reflecting surface of the beam splitter 1 and the light detector N is equal to the distance $\overline{ON}$ between the point O on the reflecting surface of the beam splitter 1 before the latter is deviated and the light detector N. Therefore, the distance between the light detector N and the convergence point A1 is longer than l by $\overline{SO}$, making it necessary to readjust the light detector N to a position N1 shown in phantom line. Thus, in the method disclosed in the prior art, since the reflected light from the disc surface guided from the beam splitter 1 to the light detector is approximately at right angles to the light emitted from the light source M to the beam splitter 1, it has been impossible to avoid the drawbacks that the beam splitter must be very accurately positioned and that complex adjustments of the light detector N are required.

SUMMARY OF THE INVENTION

Accordingly, a principal object of this invention is to provide an optical signal reading device which makes it possible to eliminate the aforesaid drawbacks and to assemble and adjust the optical system with ease and which is highly reliable.

In brief, this invention is an optical signal reading device comprising a light source, an objective which is installed slidably in the direction of the optical axis perpendicular to the disc surface of a disc-like record carrier, which focuses the light emitted from said light source on the disc surface as a spot of light, and on which the reflected light from the disc surface falls, a light detector receiving the reflected light from the disc surface via said objective, and a beam splitter composed of a single optical part disposed between the light source, light detector, and objective and provided with a pair of reflecting surfaces arranged approximately parallel to ensure that the incident light from said light source and said reflected light guided to the light detector are parallel and opposite to each other. With this arrangement, according to the invention, the allowance for positioning these optical parts can be increased and the need for complex adjustments reduced, thus making it possible to provide a highly reliable, optical signal reading device.

Other objects and features of this invention will become more apparent from a detailed description to be given below with reference to the drawings.

BRIEF DESCRIPTION OF THE DRAWINGS

FIGS. 4 through 10 are views of modifications of the beam splitter of this invention.

FIGS. 11 through 14 are views showing an embodiment of the invention;

DESCRIPTION OF THE PREFERRED EMBODIMENTS

Figure 3:
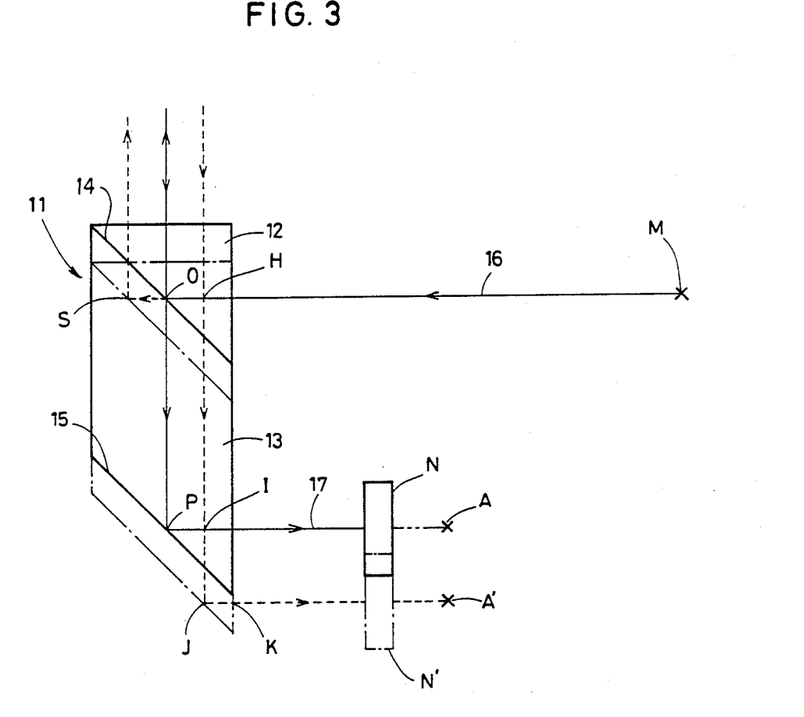
FIG. 3 is a schematic structural view for explaining the arrangement and principle of a beam splitter featuring this invention.

FIG. 3 is a structural view for explaining the arrangement of a beam splitter featuring this invention, and the principle of this invention. A beam splitter 11 has a configuration in which a first prism 12 and a second prism 13 are joined together. The first and second prisms 12 and 13 have a first reflecting surface 14 and a second reflecting surface 15, respectively. The first reflecting surface 14 reflects the light 16 from a light source M and transmits the reflected light on the disc surface from an objective (not shown). The second reflecting surface 15 reflects the reflected light from the disc surface transmitted through the first reflecting surface 14. The first and second reflecting surfaces 14 and 15 are arranged approximately parallel to each other. Therefore, the incident light 16 from the light source M is parallel and opposite to the reflected light 17 from the disc surface guided from the beam splitter 11 to a light detector N.

Next, the advantages of the beam splitter 11 shown in FIG. 3 over the conventional beam splitter 1 shown in FIG. 2 will now be described. The light emitted from the light source M is reflected at point O on the first reflecting surface 14 of the beam splitter 11 and guided to the objective (not shown). On the other hand, the reflected light from the disc surface is transmitted through the first reflecting surface 14, reflected at point P on the second reflecting surface, and guided to the light detector N. In this connection, point A in FIG. 3 denotes the convergence point of the light reflected at point P on the second reflecting surface 15, said point being in conjugate relation to the point source M with respect to the point O. As previously described with reference to the prior art, in the case of using astigmatic optical system, it is required that the distance l between the light detector N and the convergence point A be constant. As considered from these facts, the following relation holds.

Setting $\overline{OM} = L$ gives $$L = \overline{OM} + \overline{OP} + \overline{PA}.$$

$l = \overline{NA} =$ constant.

If the beam splitter 11 deviates downward as shown in phantom lines in FIG. 3, the light 16 from the light source M is reflected at point S on the first reflecting surface and guided to the objective (not shown). Therefore, the reference point moves from point O to point S and H. Thus, the length of path of light emitted from the light source M to the first reflecting surface 14 is $$\overline{SM} = \overline{SO} + \overline{OM}.$$

Setting $\overline{SO} = \Delta L$ gives $$\overline{SM} = L + \Delta L.$$

Therefore, the length of light path increases by $\Delta L$.

On the other hand, the light reflected by the disc surface is transmitted through the objective and then through point H and the first reflecting surface 14 and reflected at point J on the second reflecting surface 15 to the light detector N'. The length of path of light between the reference point H and the light detector N' is $$\overline{HJ} + \overline{JN'} = \overline{HI} + \overline{IJ} + \overline{JN'}$$

Therefore, because of the relations $\overline{HI} = \overline{OP}$, $\overline{JN'} = \overline{PN} - \overline{PI}$ and $\overline{IJ} = \overline{SO} + \overline{OH} = \overline{SO} + \overline{PI}$, the length of this path of light is $$\overline{OP} + \overline{SO} + \overline{PN} = L + \Delta L - l.$$

Before the beam splitter is displaced, the length of path of light between the reference point 1O and the light detector N is $$\overline{OP} + \overline{PN} = L - l.$$

Thus, the length of path of light between the first reflecting surface 14 and the light detector N also increase by $\Delta L$.

As is clear from the above description, the amount of change in the length of path of light between the light source M and the reference point on the first reflecting surface is equal to the amount of change in the length of path of light between the light detector N and the reference point on the first reflecting surface 14 irrespective of the amount of deviation of the beam splitter 11. Stated differently, both the length between the light source M and the disc surface and the length between the convergence point A and the disc surface remain unchanged. Thus, as is clear from FIG. 3, because of the relation $\overline{SH} = \overline{IJ}$, even if the beam splitter 11 deviates as described above, the length between the reference point S and the light source M equals the length between the reference point H and the convergence point A'.

Therefore, even if the beam splitter 11 deviates, the distance l between the convergent point A and the light detector is kept constant. Thus, even if the beam splitter 11 is installed at a deviated position, as shown in phantom lines in FIG. 3, there is no need to adjust the light detector N along the optical axis. This means that the allowance for positioning the beam splitter 11 is very large. Further, since the positioning and adjustment of the beam splitter 11 and light detector N are simplified, it is possible to produce a highly reliable optical system.

FIGS. 4 through 10 show modifications of the aforesaid beam splitter 11.

Figure 4:
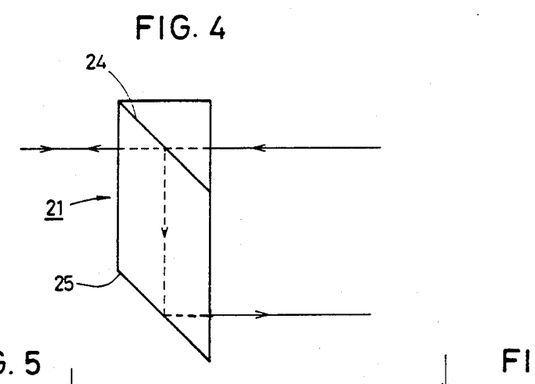
FIG. 4 shows a beam splitter wherein the reflecting surface in FIG. 1 transmits the light from the light source and the reflected light from the disc surface guided through the objective is reflected.

In FIG. 4, the first reflecting surface 24 is provided by using a beam splitter 21 having a reflecting surface which transmits the light from the light source M and reflects the reflected light from the disc surface to the second reflecting surface.

Figure 5:
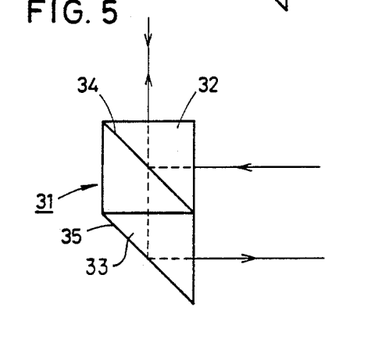
FIG. 5 shows a beam splitter of the type in which a first prism in the form of a cube having a first reflecting surface and a second prism are joined together.

In FIG. 5, a beam splitter 31 comprises a first cubic prism 32 having a first reflecting surface 34 and a second triangular prism 33 having a second reflecting surface 35, said prisms being joined together.

Figure 6:
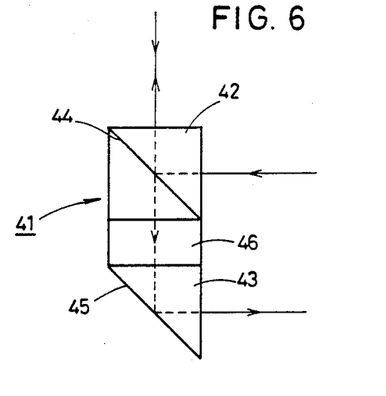
FIG. 6 shows a beam splitter wherein the first and second prisms are joined together through a light-transmitting member.

In FIG. 6, a beam splitter 41 comprises a first prism 42 and a second prism 43 joined together with a light-transmitting member 46, such as glass, interposed therebetween.

Figure 7:
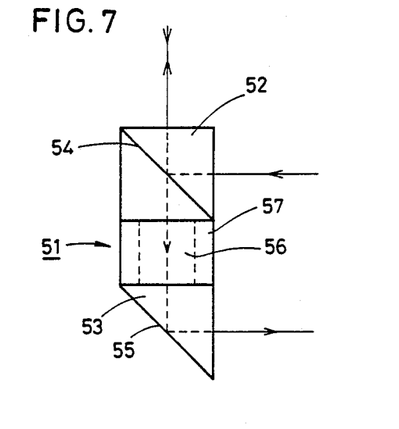
FIG. 7 shows a beam splitter wherein the first and second prisms are joined together through a non-light-transmitting member having a hollow portion serving as a light path.

In FIG. 7, a first prism 52 and a second prism 53 are joined together with a non-light-transmitting member 57 having a hollow portion 56 serving as a light path interposed therebetween.

Figure 8:
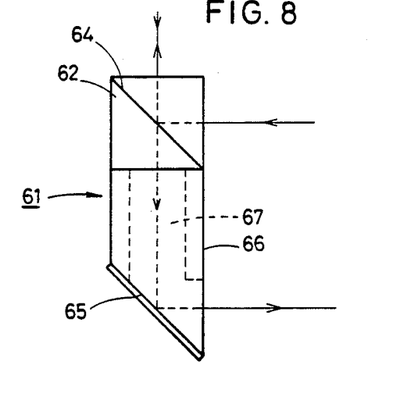
FIG. 8 shows a beam splitter wherein the first prism and a mirror forming a second reflecting surface are joined together through a non-light-transmitting member having a hollow portion serving as a light path.

In FIG. 8, a beam splitter 61 comprises a first prism 62 and a non-light-transmitting member 66 joined to said first prism 62. The non-light-transmitting member 66 has a hollow portion 67 serving as a light path and a mirror 65 serving as a first reflecting surface 64, said mirror being attached to the front end so that it is approximately parallel to the first reflecting surface 64 of the first prism 62.

Figure 9:
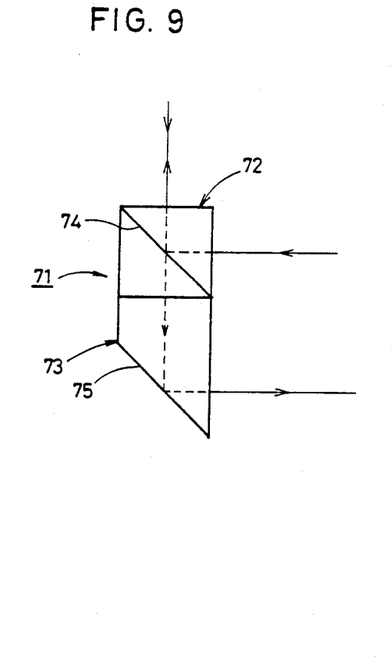
FIG. 9 shows a beam splitter wherein a cubic prism and a quadrangular prism are joined together.

In FIG. 9, a beam splitter 71 comprises a first cubic prism 72 having a first reflecting surface 74 and a second rectangular prism 73 joined to the first prism 72.

Figure 10:
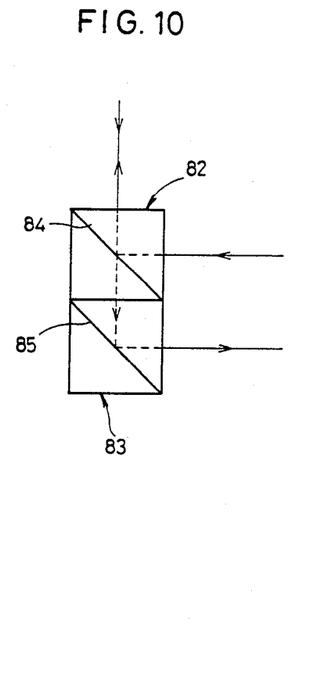
FIG. 10 shows a beam splitter having two cubic prisms joined together.

In an example shown in FIG. 10, first and second prisms 82 and 83 in cubic form are joined together, having a first reflecting surface 84 and a second reflecting surface 85, respectively.

In the beam splitters shown in FIGS. 4 through 10, as in the beam splitter 11 shown in FIG. 3, the incident light from the light source and the reflected light from the disc surface guided to the light detector can be made parallel and opposite to each other, as can be easily understood.

Figure 11:
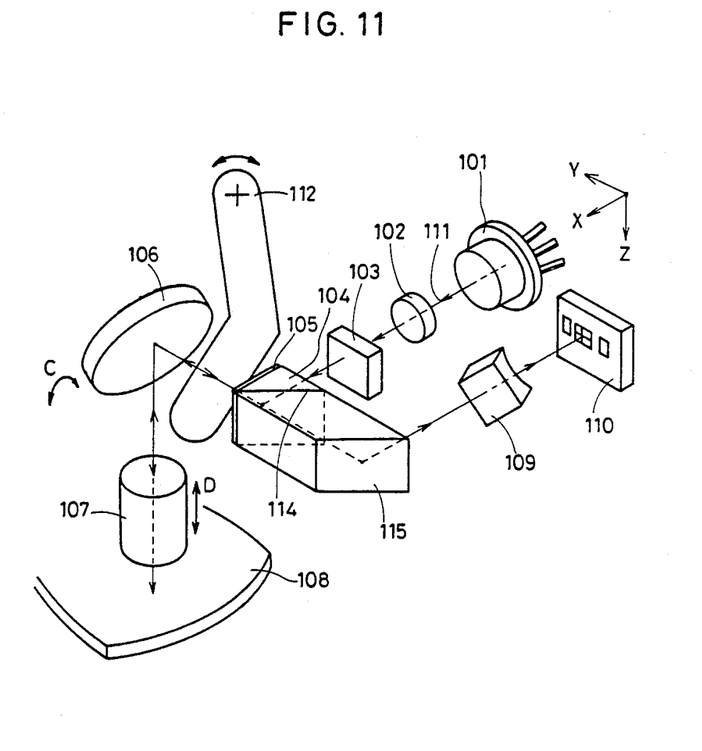
FIG. 11 is a perspective view showing the positional relation between the optical parts of said embodiment.

The arrangement of this invention having a beam splitter of the aforesaid construction will now be described. FIG. 11 is a schematic perspective view for explaining the positional relationship of optical parts according to an embodiment of the invention. Referring to FIG. 11, the numeral 101 denotes a semiconductor laser serving as a light source; 102 denotes a convex lens; 103 denotes a diffraction grating; 104 denotes a beam splitter; 105 denotes a phase plate; 106 denotes a mirror; 107 denotes an objective; 108 denotes a disc; 109 denotes a cylindrical lens; and 110 denotes a light detector.

Laser beam 111 emitted from the semiconductor laser 101 has its diffusion angle adjusted by the convex lens 102. It is then diffracted by the diffraction grating 103 into a plurality of light beams. Of the beams of diffracted light, at least the 0th and 1st orders of light are reflected by the beam splitter 104 at right angles (in the direction Y in the coordinate system shown in FIG. 11). Further, it is reflected by the mirror 106 in the direction Z to fall on the objective 107, forming a spot of light on the disc 108.

On the other hand, the light reflected by the disc 108 travels opposite to the incident light; thus, it is caused to fall on the beam splitter 104 by the objective 107, mirror 106 and phase plate 105. In the beam splitter 104, it is transmitted through the first reflecting surface 114 and reflected by the second reflecting surface 115 to the cylindrical lens 109 and then to the light detector 110. In addition, the plane defined by the X and Y axes in FIG. 11 is approximately parallel to the disc surface, and the Z axis is approximately at right angles to the disc surface. In the aforesaid arrangement, the convex lens 102, diffraction grating 103, and objective 107 are positioned approximately at right angles to the axis of the light beam, while the reflecting surfaces 114 and 115 of the beam splitter 104 and the mirror 106 are disposed so that they have planes at an angle of about 45° with respect to the optical axis. The parts are arranged in desired positional relation to each other. A shutter 112 is disposed between the phase plate 105 and the mirror 106 and has the function of interrupting the light beam during non-operation. Further, the mirror 106 is rotatable in the direction of arrow C to move the spot of light in a direction at right angles to the track (not shown) on the disc 108. The objective 107 is movable in the direction of the optical axis, namely, in the direction of arrow D.

Figure 12:
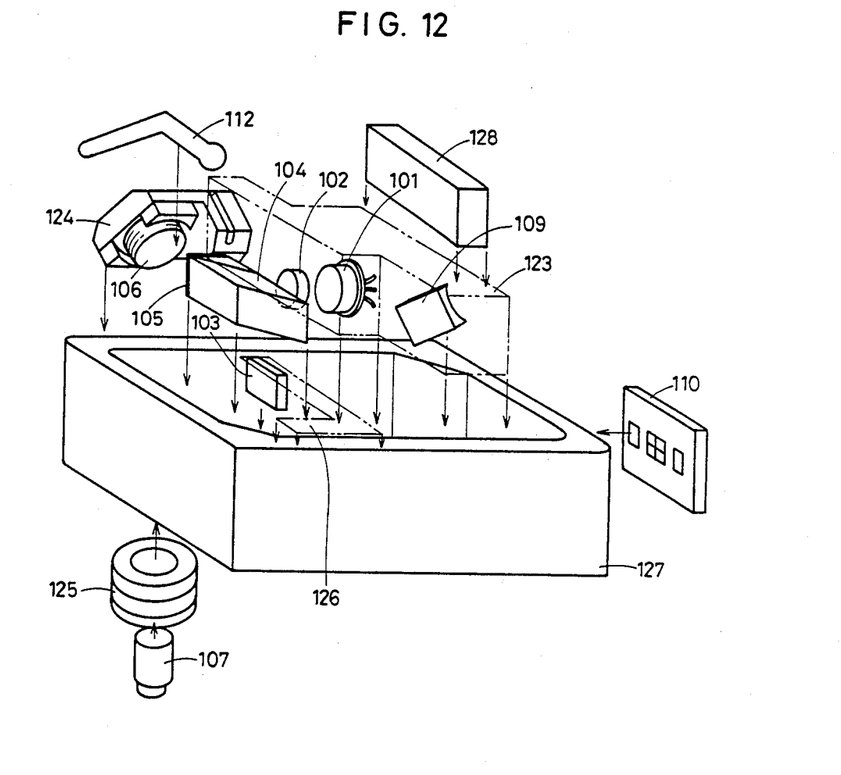
FIG. 12 is a perspective view showing how the optical parts shown in FIG. 11 are assembled in an apparatus.
Figure 13:
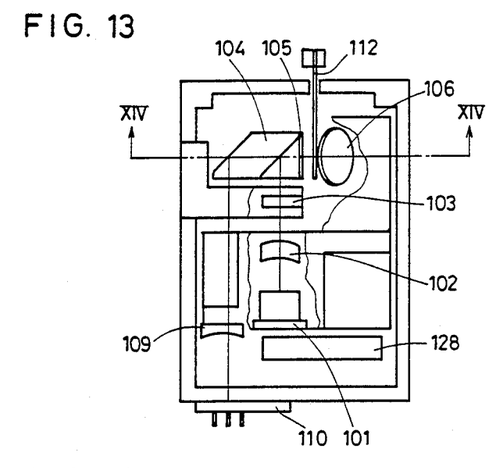
FIG. 13 is a plan view showing the optical parts in the assembled state.
Figure 14:
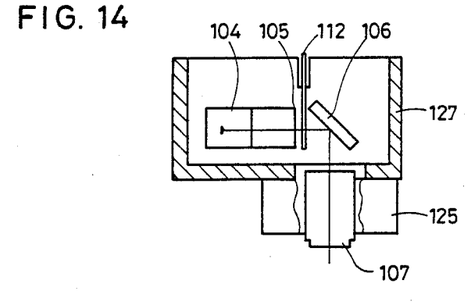
FIG. 14 is a sectional view taken along the line XIV—XIV in FIG. 13.

Reference will now be made to FIGS. 12 through 14 showing an embodiment for achieving the aforesaid arrangement. In FIG. 12, the numeral 126 denotes a holder shown in phantom lines. The holder 123 integrally and fixedly holds the semiconductor laser 101, convex lens 102, tracking actuator 124 which makes the mirror 106 rotatable, and cylindrical lens 109 in desired positional relation. The numeral 125 denotes a focus actuator making the objective 107 movable in the direction of the optical axis. The numeral 126 denotes an adjusting holder, shown in phantom lines, for holding the diffraction grating 103 so that it can be adjusted in a plane orthogonally crossing the optical axis.

The holder 123, beam splitter 104, focus actuator 125, adjusting holder 126, light detector 110, and shutter 112 are attached to the base 127 at predetermined reference positions, whereby the parts are fixed in desired positional relation.

The numeral 128 denotes an automatic output control circuit for controlling the output of the semiconductor laser to a constant value. Generally, the semiconductor laser 101 varies in output with temperature and tends to be damaged by surge. Thus, this kind of circuit has been used to solve such problems. In this embodiment, this circuit is contained in the device. Therefore, even if there is a variation in the characteristics of individual semiconductor lasers 101, the integral arrangement of the automatic control circuit 128 makes it possible to make adjustments and tests. Further, since it can be installed in the vicinity of the semiconductor laser 101, it is capable of resisting surge.

In addition, as described above, since the beam splitter 104 ensures that the incident light from the light source 101 and the reflected light guided to the light detector 110 are parallel and opposite to each other, the allowance for the positional relation between the beam splitter 104 and the light detector 110 is very large. Thus, it will be easily understood that the assembly and adjustment of the device of this embodiment are very easy.

In the above description, an astigmatic optical system has been used. However, it should be pointed out that this invention is equally effective when other types of light detecting mechanisms are used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical signal reading device comprising a light source,
    an objective slidable in the direction of the optical axis which is at right angles to a disc surface of a disc-like record carrier, said objective serving to focus the light emitted from said light source on the disc surface as a spot of light, the reflected light from the disc surface falling on said objective,
    a light detector receiving the light reflected from said disc surface via said objective, and
    a beam splitter composed of a single optical part disposed between said light source, light detector, and objective, said splitter having a pair of reflecting surfaces disposed approximately parallel to each other to ensure that the incident light from said light source and the reflected light guided to said light detector are generally parallel and opposite to each other.

2. An optical signal reading device as set forth in claim 1, wherein said beam splitter is a single optical part including a first prism having a first reflecting surface which reflects the light from the light source and transmits the reflected light from the objective, and a second prism having a second reflecting surface which reflects the reflected light from the disc surface transmitted through said first reflecting surface, said first and second prisms being joined together.

3. An optical signal reading device as set forth in claim 2, wherein said first and second prisms are joined together through a light-transmitting member.

4. An optical signal reading device as set forth in claim 1, wherein said beam splitter is a single optical part including a first prism having a first reflecting surface which transmits the light from the light source and reflects the reflected light from the disc surface via the objective, and a second prism having a second reflecting surface which reflects the light reflected by said first reflecting surface, said first and second prisms being joined together.

5. An optical signal reading device as set forth in claim 4, wherein said first and second prisms are joined together through a light-transmitting member.

6. The optical signal reading device of claim 1, further including means for mounting the beam splitter in said device so that the optical axis of said objective is disposed substantially at a right angle to a plane defined by the incident light beam and light beam reflecting towards the light detector.

7. The optical signal reading device of claim 6, wherein a first reflecting surface formed at one end of said beam splitter is in alignment with the optical axis of the light source to reflect an incoming incident light beam therefrom through approximately 90° towards a mirror mounted directly adjacent said first reflecting surface, said mirror reflecting said beam through about 90° towards and in a direction generally parallel to the optical axis of said objective, said mirror being further operative to reflect a reflected light beam from the disc surface falling on said objective through 90° for transmission through the first reflecting surface and single beam splitter towards a second reflecting surface formed at the opposite end of the beam splitter for reflection through 90° towards said light detector.

8. The optical signal reading device of claim 6, wherein a first surface formed at one end of said beam splitter is in alignment with the optical axis of the light source to transmit through said first surface an incoming incident light beam towards a mirror mounted directly adjacent said first surface, said mirror reflecting said beam through about 90° towards and in a direction generally parallel to the optical axis of said objective, said mirror being further operative to reflect a reflected light beam from the disc surface falling on said objective through 90° for reflection off said first surface through 90° through said single beam splitter towards a second surface formed at the opposite end of the beam splitter, said second surface reflecting the reflected beam through about 90° towards said light detector.

9. An optical signal reading device comprising a light source,
    an objective slidable in the direction of the optical axis which is at right angles to the disc surface of a disc-like record carrier, said objective serving to focus the light emitted from said light source on the disc surface as a spot of light, the reflected light from the disc surface falling on said objective,
    a light detector which receives the reflected light coming from said disc surface via said objective, and
    a beam splitter disposed between said light source, light detector and said objective, said splitter having a pair of first and second reflecting surfaces being approximately parallel to each other, said first reflecting surface being disposed to reflect an entire beam of incident light from the light source to the objective and being further arranged to transmit from said objective substantially all of a detection light beam received from said objective and passing entirely through the first surface for reflection against said second surface towards the light detector, said incident light beam from the light source and said detection light beam reflected towards said light detector traveling along paths generally parallel and opposite to each other.

10. An optical signal reading device comprising a light source,
    an objective slidable in the direction of the optical axis which is at right angles to a disc surface of a disc-like record carrier, said objective serving to focus the light emitted from said light source on the disc surface as a spot of light, the reflected light from the disc surface falling on said objective,
    a light detector receiving the light reflected from said disc surface via said objective, and
    a beam splitter composed of a single optical part disposed between said light source, light detector, and objective, said splitter having a pair of reflecting surfaces disposed approximately parallel to each other to ensure that the incident light from said light source and the reflected light guided to said light detector are generally parallel and opposite to each other, wherein said beam splitter is a single optical part including a first prism having a first reflecting surface which reflects the light from the light source and transmits the reflected light from the objective, and a second prism having a second reflecting surface which reflects the reflected light from the disc surface transmitted through said first reflecting surface, wherein said first and second prisms are joined together through a non-light-transmitting member having a hollow portion serving as a path for light, so that the reflected light transmitted through the first reflecting surface is guided to the second reflecting surface through said hollow portion.

11. The optical signal reading device of claim 10, further, including a phase plate attached to said single optical part for separating light falling on said disc surface and light reflected from said disc surface from each other.

12. The optical signal reading device of claim 10, wherein said non-light transmitting member includes side wall means extending between to connect said first and second prisms together, said side wall means being open at opposite ends thereof and defining therebetween said hollow portion serving as said path for light.

13. An optical signal reading device comprising a light source,
   an objective slidable in the direction of the optical axis which is at right angles to a disc surface of a disc-like record carrier, said objective serving to focus the light emitted from said light source on the disc surface as a spot of light, the reflected light from the disc surface falling on said objective,
   a light detector receiving the light reflected from said disc surface via said objective, and
   a beam splitter composed of a single optical part disposed between said light source, light detector, and objective, said splitter having a pair of reflecting surfaces disposed approximately parallel to each other to ensure that the incident light from said light source and the reflected light guided to said light detector are generally parallel and opposite to each other, wherein said beam splitter is a single optical part including a first prism having a first reflecting surface which transmits the light from the light source and reflects the reflected light from the disc surface via the objective, and a second prism having a second reflecting surface which reflects the light reflected by said first reflecting surface, wherein said first and second prisms are joined together through a non-light-transmitting member having a hollow portion serving as a path for light, so that the reflected light from the disc surface reflected by the first reflecting surface is guided to the second reflecting surface through said hollow portion.

14. The optical signal reading device of claim 13, further including a phase plate attached to said single optical part for separating light falling on said disc surface and light reflected from said disc surface from each other.

15. An optical signal reading device comprising a light source,
   an objective slidable in the direction of the optical axis which is at right angles to a disc surface of a disc-like record carrier, said objective serving to focus the light emitted from said light source on the disc surface as a spot of light, the reflected light from the disc surface falling on said objective,
   a light detector receiving the light reflected from said disc surface via said objective, and
   a beam splitter composed of a single optical part disposed between said light source, light detector, and objective, said splitter having a pair of reflecting surfaces disposed approximately parallel to each other to ensure that the incident light from said light source and the reflected light guided to said light detector are generally parallel and opposite to each other, wherein between said light source and said beam splitter, there are installed a lens for correcting the diversion angle of the light emitted from said light source and a diffraction grating for diffractively separating the light from said lens into a plurality of light beams,
   between said beam splitter and said objective, there are installed a phase plate for separating the light falling on said disc surface and the light reflected from the disc surface from each other, and a mirror for reflecting the incident light and reflected light so that the incident light guided through said beam splitter can be guided to said objective and so that reflected light from the disc surface guided through the objective can be guided to said beam splitter, and
   between said beam splitter and said light detector, there is installed a cylindrical lens for producing astigmatism in the reflected light from the disc surface, said light detector being a photoelectric conversion element.

16. An optical signal reading device comprising a light source,
   an objective slidable in the direction of the optical axis which is at right angles to a disc surface of a disc-like record carrier, said objective serving to focus the light emitted from said light source on the disc surface as a spot of light, the reflected light from the disc surface falling on said objective,
   a light detector receiving the light reflected from said disc surface via said objective, and
   a beam splitter composed of a single optical part disposed between said light source, light detector, and objective, said splitter having a pair of reflecting surfaces disposed approximately parallel to each other to ensure that the incident light from said light source and the reflected light guided to said light detector are generally parallel and opposite to each other, further including a phase plate attached to said single optical part for separating light falling on said disc surface and light reflected from said disc surface from each other.

17. An optical signal reading device comprising a light source,
   an objective slidable in the direction of the optical axis which is at right angles to a disc surface of a disc-like record carrier, said objective serving to focus the light emited from said light source on the disc surface as a spot of light, the reflected light from the disc surface falling on said objective,
   a light detector which receives the reflected light coming from said disc surface via said objective, and
   a beam splitter disposed between said light source, light detector and said objective, said splitter having a pair of first and second reflecting surfaces being approximately parallel to each other, said first reflecting surface being disposed to reflect an entire beam of incident light from the light source to the objective and being further arranged to transmit from said objective substantially all of a detection light beam received from said objective and passing entirely through the first surface for reflection against said second surface towards the light detector, said incident light beam from the light source and said reflected detection light beam reflected towards said light detector traveling along paths generally parallel and opposite to each other, further including a phase plate attached to said single optical part for separating light falling on said disc surface and light reflected from said disc surface from each other.

18. An optical signal reading device comprising a light source,
   an objective slidable in the direction of the optical axis which is at right angles to a disc surface of a disc-like record carrier, said objective serving to focus the light emitted from said light source on the disc surface as a spot of light, the reflected light from the disc surface falling on said objective,
   a light detector receiving the light reflected from said disc surface via said objective, and
   a beam splitter composed of a single optical part disposed between said light source, light detector, and objective, said splitter having first and second reflecting surfaces disposed approximately parallel to each other to ensure that the incident light from said light source and the reflected light guided to said light detector are generally parallel and opposite to each other, further including a light transmitting member having side wall means extending between to connect said first and second surfaces together, said side wall means being open at opposite ends thereof and defining therebetween a hollow portion serving as a path for light transmitted between said first and second surfaces.

19. An optical device comprising:
   a light source,
   an objective for focusing light from the light source onto a storage surface of a recording medium,
   a light detector for receiving light reflected from the storage surface of the recording medium by way of the objective, and
   beam splitting and reflecting means arranged between the light source and the objective and between the light detector and the objective and having first and second reflecting surfaces,
   the parts being so arranged that light traveling from the light source to the object is incident on the first reflecting surface from a first direction and reflected light traveling to the light detector from the objective leaves the second reflecting surface in a second direction, the said first and second directions being generally parallel to each other, wherein
   said beam splitting and reflecting means includes a beam splitter carrying the first and second reflecting surfaces and which thereby bears the said first and second reflecting surfaces fast with each other.

* * * * *